May 7, 1957     H. C. KNARZER     2,791,437
LAWN MOWER HANDLE ADJUSTMENT AND SAFETY DEVICE
Filed Sept. 22, 1953
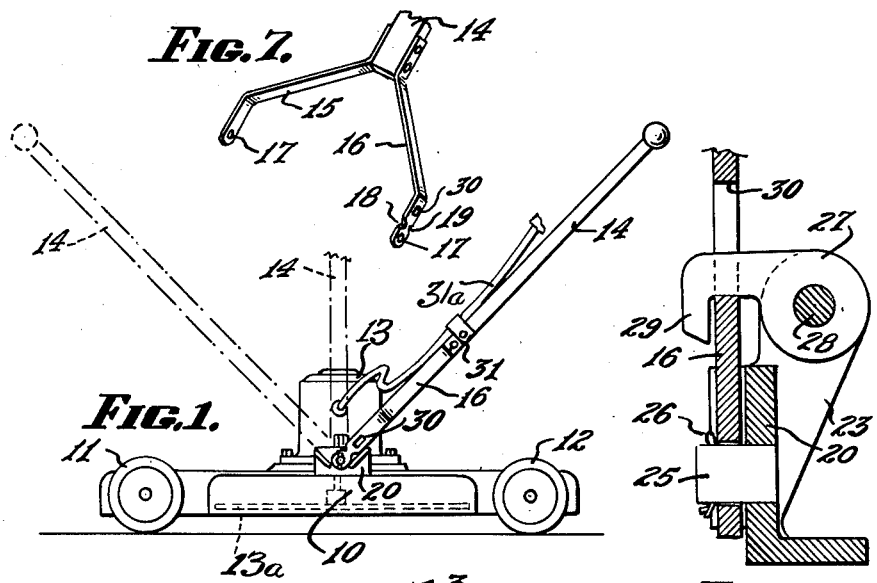
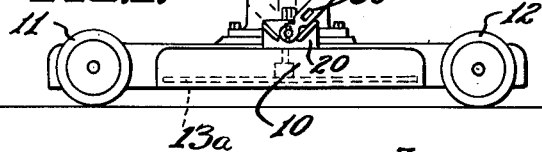
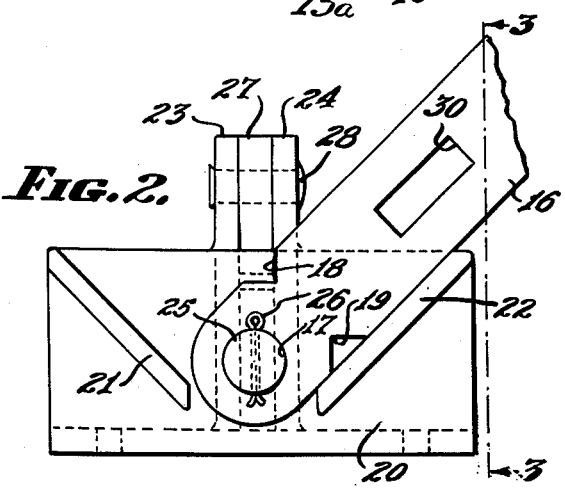
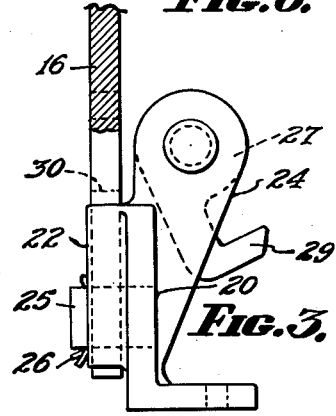
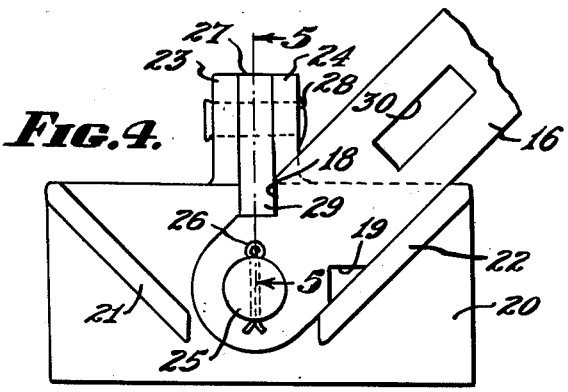
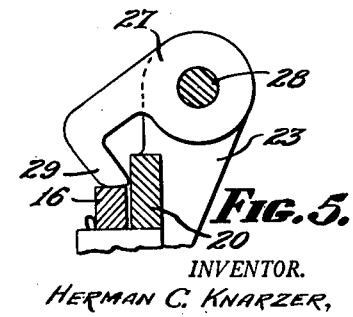
INVENTOR.
HERMAN C. KNARZER,
BY
    Allen & Allen
ATTORNEYS.

United States Patent Office 2,791,437
Patented May 7, 1957

2,791,437
LAWN MOWER HANDLE ADJUSTMENT AND SAFETY DEVICE

Herman C. Knarzer, Richmond, Ind., assignor to Dille & McGuire Mfg. Co., Richmond, Ind., a corporation of Indiana Application September 22, 1953, Serial No. 381,665

3 Claims. (Cl. 280—47.36)

My invention has to do with the provision of mechanism for lawn mower handles, particularly those employed with electric lawn mowers, to make the use of such lawn mowers more safe.

A primary object of my invention, therefore, is to provide a safety device for electric lawn mower handles which will enable one to use the lawn mower on terraces and hillsides with far more safety than has heretofore been possible.

Another object of my invention is to provide such a safety device that will also enable the handle to be maintained in a vertical position for storage or transportation.

An important object of my invention is to provide a device for use with the lawn mower handle when hillsides are to be cut that is so simple in operation that women and children will have no difficulty in employing the safety device.

These and other objects of my invention will become apparent during the course of the following description and with reference to the accompanying drawings, in which drawings like numerals are employed to designate like parts throughout and in which:

Figure 1 is a side elevation of an electric lawn mower employing the instant invention, Figure 2 is an enlarged fragmentary side elevation of that part of the mower to which the lawn mower handle is joined, Figure 3 is a section taken on the line 3—3 of Figure 2, Figure 4 is a view similar to Figure 2 but showing the latch member in operative position, Figure 5 is a section on the line 5—5 of Figure 4, Figure 6 is a view generally similar to that of Figure 5 but showing the position of the latch when the lawn mower handle is maintained in a vertical position for transportation or storage, and Figure 7 is a perspective of the lower handle sections.

I have shown my invention as applied to an electric lawn mower comprising a body 10 having front and rear wheels 11 and 12 and a motor 13 mounted on the body. A revolving blade 13a is operated by the motor and serves to cut the grass to predetermined heights.

The lawn mower handle comprises a member 14 and a pair of extensions 15 and 16. The handle member 16 is provided with a hole 17 by which it is mounted on a suitable stud as will be described and this member is also provided with a pair of notches 18 and 19 the purpose of which will be described shortly. The handle extension member 15 is provided only with a hole 17 for the instant invention need be applied only to one of these extension members and this will be shown in connection with the member 16.

It has been found that electric lawn mowers of this type may best be employed on level ground by having the cable 31a by which electric current is supplied to the motor 13 attached to one side of the handle 14. This handle is then pivotally mounted so that it may be moved from a position such as shown in full lines in Figure 1 to a position as indicated in the left hand dotted lines. In use one will push the lawn mower a length to be cut and then move the handle from the position of the full lines to the dotted lines just mentioned and reverse the direction of such mower. In this manner the cable 31a is always kept to one side of the mower, the operator thus being able to walk around the other side of the mower when the handle is moved so that the chances of getting tangled in the cable are materially reduced. It will be observed that in order for this type of operation to be successfully carried out it is necessary that the handle be able to be pivoted in the manner described.

This arrangement has proved quite satisfactory for cutting reasonably level ground but when it is desired to use the lawn mower on steep hillsides and terraces a distinct problem has come into being. When the lawn mower is pushed up a steep hillside the mower, because of the pivotal connection between the handle and the body of the mower, has a tendency to roll back towards the feet of the operator, the handle simply moving about is pivot. This has proved very dangerous and many serious accidents have been occasioned simply because the mower is difficult to control in such operations.

My invention provides a device which enables the necessary pivoted relationship between the handle and the lawn mower body to be maintained while at the same time providing a safety device which prevents or does away with this pivotal relationship during those times when the mower is being used on steep hillsides.

My invention comprises a casting 20 which is L shaped and which bears a pair of lugs 21 and 22 on one face thereof and a second pair of lugs on the opposite face. The second pair of lugs is indicated at 23 and 24. A stud 25 is rigidly secured to the plate or casting 20.

The extension member 16 is provided with a hole 17 which fits over this stud 25, a cotter pin or the like 26 maintaining the extension on this stud.

A latch 27 is pivotally mounted on a pin 28 between the lugs 23 and 24. This latch 27 has a hooked end 29. The extension 16 has an opening 30 provided therein. The cable connection to the handle is indicated at 31.

In the normal operation of a lawn mower to which my invention is applied, the latch 27 is in the out-of-the-way position indicated in Figures 2 and 3. In this position the handle extension 16 will abut the lug 22 and the mower may be pushed from right to left as viewed in these figures. Upon reaching the left hand end of the patch to be cut the handle is swung so that the extension 16 lies against the lug 21 and the mower then moved from left to right. When, however, it is desired to push the lawn mower up a hill or terrace, the extension 16 being then against the lug 22 by way of example, the operator will simply reach over and flip the latch 27 from the position of Figures 2 and 3 to that of Figures 4 and 5. In the position of Figures 4 and 5 the latch 27, through its hooked end 29, engages within the notch 18 provided in the extension 16. This makes it impossible for the handle to be pivoted about the stud 25. Thus a hillside may be cut without fear of the mower falling back upon the feet of the operator due to the pivotal connection ordinarily existing between the handle and body of the mower.

If it so happens that at the time the operator wished to move the lawn mower up a hill the extension 16 were then against the lug 21, it would be obvious that the same result is achieved by moving the latch 27 so that the hooked portion 29 engages within the notch 19. Whether the latch is engaged in notch 18 or 19 the result is the same; the handle 14, through its extensions 16 and 17, is no longer free to pivot about the stud 25. When it is desired to again cut a more or less level patch in which case the lawn mower is moved from left to right and right to left, the latch will be moved to the position of Figure 3 so that the free pivotal relationship between the handle and mower body will again exist.

I have provided the extension 16 with an opening 30 so that when it is desired to store the lawn mower with the handle 14 in vertical position, or to ship same, one may maintain the handle in the desired vertical condition simply by moving the latch 27 so as to engage the hook 29 within the hole 30 provided in the extension 16. This will prevent pivotal movement of the handle in either direction and maintain it vertically.

It will be apparent from the foregoing description that the member 20 with the lugs 21 through 24 may be formed or cast as an integral unit. Bolts passed through the foot of the L shaped member 20 will securely hold it to the body of the lawn mower. It will be observed that I have indicated that this arrangement need only be carried out in connection with one or the other of the handle extensions 15 and 16. If desired, however, a similar latch arrangement may be devised for both members. It will also be apparent that the stud 25 is made an integral part of the casting in that it is securely fixed thereto.

Thus I have provided a very simple and sturdy arrangement by which a lawn mower handle may be pivotally mounted to the mower body so as to make possible normal operation of the lawn mower over reasonably level ground. At the end of each path of cut the operator simply swings the handle about its pivot and starts back in the reverse direction without having to turn the whole lawn mower around. My device permits not only this normal use of the handle but it also prevents the just described pivoted or swinging movement at those times when this movement is not desired, namely, when the mower is being pushed uphill. Also, my invention is extremely simple to use in that it involves simply a flip of a latch to engage same within a notch provided in the handle extension. When the lawn mower is to be stored the same mechanism will maintain the handle in vertical condition if desired.

It will be obvious to those skilled in the art that modifications may be practiced in my invention without departing from its scope and spirit. It will be further understood that while I have shown my invention as embodied in certain specific structure I do not intend to be limited to such structure except insofar as it is specifically set forth in the subjoined claims.

Having thus described my invention what I claim as new and what I desire to secure by United States Letters Patent is:

1. A safety device for lawn mowers and the like having handles, said device comprising a block member having a pair of inclined lugs on one side thereof against which said handle may lie, a second pair of lugs on the opposite side of said member, and a latch pivoted on said second pair of lugs for swinging movement in a vertical plane passing between said first mentioned inclined lugs.

2. The device of claim 1 including a stud to be received by a said handle, said stud being fixed to said member on said one side between said inclined lugs and beneath said latch.

3. A safety device for lawn mowers and the like having handles, said device comprising a base member, a pair of lugs on said base member and disposed opposite one another, each said lug having a bearing surface inclined towards the other said lug, a latch, mounting means on said member for said latch, said latch being pivoted on said mounting means for swinging movement in a vertical plane passing between said lugs, and means on said member to receive a said handle for swinging movement from one said bearing surface to the other.

References Cited in the file of this patent
UNITED STATES PATENTS

| | | |
|---|---|---|
| D. 167,129 | Abel et al. | July 1, 1952 |
| D. 172,936 | Phelps | Aug. 31, 1954 |
| 166,237 | Whitney | Aug. 3, 1875 |
| 490,114 | Hanson | Jan. 17, 1893 |
| 1,042,193 | Bowling | Oct. 22, 1912 |
| 1,197,229 | O'Hearn | Sept. 5, 1916 |
| 1,389,249 | Kitchel | Aug. 30, 1921 |
| 1,686,934 | Serva | Oct. 9, 1928 |
| 2,100,379 | Cervenka et al. | Nov. 30, 1937 |
| 2,672,002 | Nelson | Mar. 16, 1954 |
| 2,716,559 | Boyce | Aug. 30, 1955 |

FOREIGN PATENTS

| | | |
|---|---|---|
| 40,278 | Germany | Jan. 15, 1887 |
| 169,326 | Great Britain | Sept. 29, 1921 |